United States Patent
Podoloff et al.

[19]

[11] Patent Number: 5,991,676
[45] Date of Patent: Nov. 23, 1999

[54] SEAT OCCUPANT SENSING SYSTEM

[75] Inventors: Robert Michael Podoloff, Framingham, Mass.; Ronald Anthony Vallette, Jr., Lakeland, Fla.

[73] Assignee: Breed Automotive Technology, Inc., Lakeland, Fla.

[21] Appl. No.: 08/755,272

[22] Filed: Nov. 22, 1996

[51] Int. Cl.⁶ ............................ B60R 21/32; B60K 28/00; G01L 5/00
[52] U.S. Cl. ................................ 701/45; 73/767; 73/781; 73/790; 73/862.046; 73/862.68; 73/862.625
[58] Field of Search ............................. 73/767, 774, 777, 73/781, 756, 786, 790, 805, 818, DIG. 4, 862.043, 862.046, 862.68, 862.627, 862.621, 862.625; 701/45, 46, 47, 49

[56] References Cited

U.S. PATENT DOCUMENTS

| | | | |
|---|---|---|---|
| 3,657,475 | 4/1972 | Peronneau et al. | 73/862.046 |
| 4,047,427 | 9/1977 | Young | 73/862.046 |
| 4,361,741 | 11/1982 | Leskoverc et al. | 200/85 |
| 4,509,614 | 4/1985 | Bando et al. | 180/273 |
| 4,607,199 | 8/1986 | Krueger et al. | 318/484 |
| 4,633,237 | 12/1986 | Tucknott et al. | 340/573 |
| 4,655,313 | 4/1987 | Hicks | 180/273 |
| 4,678,058 | 7/1987 | Wooters | 180/273 |
| 4,691,556 | 9/1987 | Mellander et al. | 73/862.046 |
| 4,745,565 | 5/1988 | Garwin et al. | 73/862.046 |
| 4,806,713 | 2/1989 | Krug et al. | 200/85 |
| 4,974,454 | 12/1990 | Wolfer et al. | 73/862.68 |
| 5,036,306 | 7/1991 | Bergkvist | 73/862.68 |
| 5,086,652 | 2/1992 | Kropp | 73/767 |
| 5,109,945 | 5/1992 | Koga | 180/273 |
| 5,120,980 | 6/1992 | Fontaine | 307/16.1 |
| 5,121,929 | 6/1992 | Cobb | 277/2 |
| 5,131,259 | 7/1992 | Krop | 73/1 |
| 5,161,820 | 11/1992 | Vollmer | 280/730 |
| 5,164,709 | 11/1992 | Lamberty et al. | 340/667 |
| 5,222,399 | 6/1993 | Kropp | 73/862.68 |
| 5,232,243 | 8/1993 | Blackburn et al. | 280/732 |
| 5,398,185 | 3/1995 | Omura | 701/45 |
| 5,398,962 | 3/1995 | Kropp | 280/731 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,466,001 | 11/1995 | Gotomyo et al. | 280/730.1 |
| 5,474,327 | 12/1995 | Schousek | 280/735 |
| 5,481,078 | 1/1996 | Asche | 200/85 |
| 5,494,311 | 2/1996 | Blackburn et al. | 280/735 |
| 5,541,570 | 7/1996 | McDowell | 338/74 |
| 5,563,354 | 10/1996 | Kropp | 73/862.473 |
| 5,571,973 | 11/1996 | Taylot | 73/DIG. 4 |
| 5,612,876 | 3/1997 | Zeidler et al. | 701/45 |
| 5,844,486 | 12/1998 | Kithil et al. | 701/45 |
| 5,877,436 | 3/1999 | Faust et al. | 73/862.043 |
| 5,900,677 | 5/1999 | Musiol et al. | 701/45 |

FOREIGN PATENT DOCUMENTS 0728636  8/1996  European Pat. Off. .

Primary Examiner—George Dombroske
Attorney, Agent, or Firm—Lonnie R. Drayer; Beth A. Vrioni

[57] ABSTRACT

A seat occupant sensing system has a plurality of variable resistance force sensors located between a rigid seat support member and the floor of the vehicle. The force transferred from the rigid seat support member to the floor of the vehicle passes through said variable resistance force sensors which sense the magnitude of the force transferred therethrough and generate a signal which is indicative of the force transferred therethrough resistance force sensors interposed between a rigid seat support member and a rigid seat pan member such that the weight supported by the seat pan member is transferred from the seat pan member to the seat support member via said at least one variable resistance force sensor which senses the magnitude of the weight transferred therethrough. A device, such as a microprocessor, processes a signal from the variable resistance force sensors to determine the weight that the rigid seat pan member is bearing. The signal processing device may control the activation and operation of a safety device such as an airbag or seat belt pretensioner as a function of the presence of and weight of a seat occupant.

34 Claims, 9 Drawing Sheets

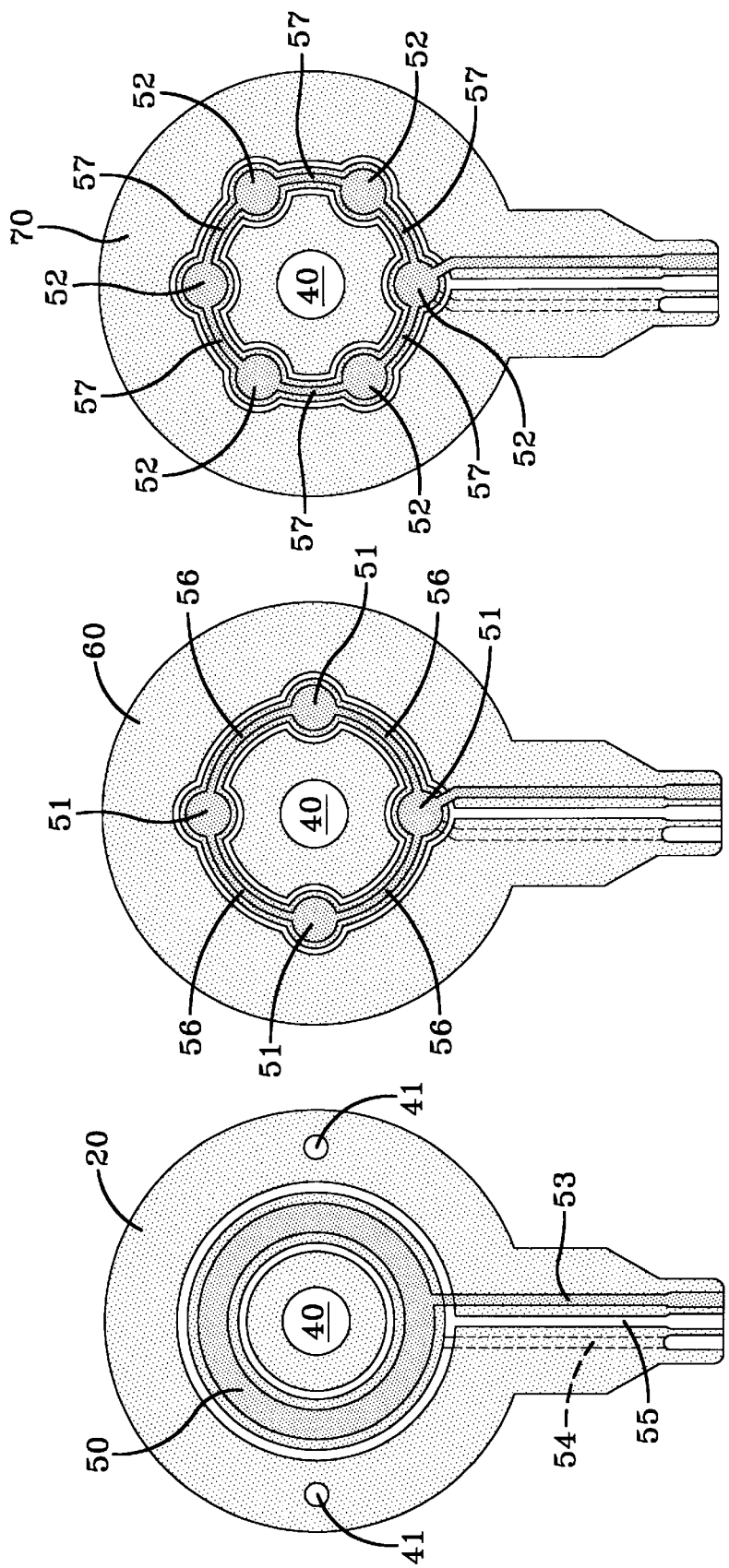

SEAT OCCUPANT SENSING SYSTEM

The present invention relates to an apparatus for sensing the presence and weight of an occupant of a vehicle seat.

BACKGROUND OF THE INVENTION

Many vehicles are equipped with safety devices such as airbags, seat belt pretensioners and so forth to protect persons occupying various seats in the vehicle. If a seat is unoccupied or is occupied by a person of a particular size, it may not be necessary to activate a safety device associated with that seat. Furthermore, if a seat is occupied by a person of a particular size the manner in which a safety device is employed may be varied accordingly. One indicator of the size of a seat occupant is his or her weight. In the case of an infant, the combined weight of the infant and an infant safety seat is useful as an indicator of occupant size.

SUMMARY OF THE INVENTION

There is provided in accordance with one aspect of the present invention a seat occupant sensing system comprising: (a) a seat having a rigid seat pan member and a rigid seat support member, said seat being fastened to the floor of a vehicle; (b) a plurality of variable resistance force sensors located between the rigid seat pan member and the floor of the vehicle with the force transferred from the rigid seat pan member to the floor of the vehicle passing through said variable resistance force sensors which sense the magnitude of the force transferred therethrough and generate a signal which is indicative of the force transferred therethrough; and (c) a device which processes said signals to determine the weight that the rigid seat pan member is bearing.

There is provided in accordance with another aspect of the present invention a seat occupant sensing system comprising: (a) a seat having a rigid seat pan member and a rigid seat support member, said seat being fastened to the floor of a vehicle; (b) a plurality of variable resistance force sensors located between the rigid seat pan member and the floor of the vehicle with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and (c) a controller which processes the signals from said variable resistance force sensors to determine the weight that the rigid seat pan member is bearing and controls the activation of at least one safety device for an occupant of said seat based upon said weight.

There is provided in accordance with another aspect of the present invention a seat occupant sensing system comprising: (a) a seat having a rigid seat pan member and a rigid seat support member, said seat being fastened to the floor of a vehicle; (b) a plurality of variable resistance force sensors interposed between and adjacent to both the rigid seat support member and the rigid seat pan member with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and (c) a controller which processes the signals from said variable resistance force sensors to determine the weight that the rigid seat pan member is bearing and controls the activation of at least one safety device for an occupant of said seat based upon said weight.

There is provided in accordance with yet another aspect of the present invention a seat occupant sensing system comprising: (a) a seat having a rigid seat pan member and a rigid seat support member, said seat being fastened to the floor of a vehicle; (b) a plurality of variable resistance force sensors interposed between the rigid seat support member and the floor of the vehicle in a location adjacent to the floor of the vehicle with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and (c) a controller which processes the signals from said variable resistance force sensors to determine the weight that the rigid seat pan member is bearing and controls the activation of at least one safety device for an occupant of said seat based upon said weight.

DISCUSSION OF THE PRIOR ART

The seat occupant sensing system disclosed herein employ a plurality of variable resistance force sensors. The preferred force sensors are thin film sensors of the type for which the structure, manufacture and use are disclosed, for example, in U.S. Pat. No. 5,086,652, U.S. Pat. No. 5,121,929, U.S. Pat. No. 5,131,259, U.S. Pat. No. 5,222,399, U.S. Pat. No. 5,398,962, U.S. Pat. No. 5,541,570, U.S. 5,474,327 and U.S. 5,563,354.

U.S. Pat. No. 5,232,243 and U.S. Pat. No. 5,494,311 teach a seat occupant sensor that is a piezoelectric film which is rigidly mounted to a substantially inflexible bottom portion of the seat. A plurality of sensing elements are arranged in rows and columns forming an array. U.S. Pat. No. 5,454,591 teaches the use of this sensor to determine if a vehicle seat is occupied by an occupant weighing up to 40 pounds (about 18.2 kilograms) or more than 40 pounds (about 18.2 kilograms) and send an appropriate signal to a safety device control unit.

U.S. Pat. No. 5,474,327 teaches a seat occupant presence, weight and position sensor system wherein a plurality of sensors are located in the seat base just beneath the seat cover and some pressure is exerted on the sensors by the seat cover. The preferred sensors are mounted between polymer sheets and include a pair of conductive electrodes about 2.54 centimeters (1 inch) in diameter separated by carbon layers such that resistance between electrodes decreases as pressure increases.

U.S. Pat. No. 5,161,820 teaches a seat occupant sensor which is a switch, preferably a flat mat-like contact switch wherein two contact layers are separated by an intermediate elastically deformable, electrically conductive layer. The contact switch is mechanically activated when the seat occupant compresses the intermediate layer and completes a conductive pathway for the switching circuit. The use of a simple physical contact switch or a condenser-type switch is also disclosed. However, the seat structure incorporating any of these switches is not shown in the drawings or described in the specification. The seat occupant sensor taught in this patent employs sensors located both in the seat and in the floor in front of the seat.

U.S. Pat. No. 4,678,058 teaches a vehicle seat switch assembly including a generally C-shaped spring located underneath the seat cushion. The end portions of the spring are displaced laterally when the spring is depressed when the seat is occupied. The lateral displacement of the spring ends pulls a switch plunger to close the switch.

U.S. Pat. No. 5,413,378 and U.S. Pat. No. 5,439,249 teach the use of an occupant weight sensor located in or on a structure that includes a seat cushion. The exact structure and operation of the occupant weight sensor is not disclosed in either of these patents. U.S. Pat. No. 5,466,001 teaches the use of sensors embedded in a seat cushion and seat back to sense occupant presence, but the structure of the sensors is not disclosed. U.S. Pat. No. 5,109,945 also teaches the use of a seat switch to detect a seat occupant but does not disclose the structure of the switch or the manner of incorporating the switch into the seat.

U.S. 5,481,078 teaches a set occupant sensor wherein the seat rails pivot about their forward end against leaf springs designed to support the seat weight plus a known fraction of the occupant's weight so that the rear of the seat is raised when the seat is unoccupied. When the seat is occupied, the rear of the seat moves down and an electronic sensor detects seat position to provide a position signal. U.S. Pat. No. 4,655,313, U.S. Pat. No. 4,361,741 and U.S. Pat. No. 4,509,614 also teach a vehicle seat switch used with a seat which pivots relative to the front of the seat cushion.

U.S. Pat. No. 5,120,980 teaches a foam seat cushion confining wire mesh electrical switch closing contacts. U.S. Pat. No. 5,164,709 teaches a seat occupant sensor which is a lateral-force-sensitive cable laid in a meandering pattern foamed into the seat cushion.

U.S. Pat. No. 4,806,713 teaches a seat-contact switch for generating a "seat occupied" signal when a seat suspension approaches a seat frame as a result of seat loading. An articulatable device is fastened on one end to the seat suspension and on the other end to the seat frame. U.S. Pat. No. 4,607,199 teaches the use of a seat switch in conjunction with a microprocessor to disable operation of a vehicle if the seat occupant is out of position for a given period of time. The switch structure and manner of incorporating the switch into the seat are not disclosed.

EP 0 728 636 A1 teaches the use of a switch sensor switch disposed in a seat base but does not disclose the switch structure and manner of incorporating the switch into the seat.

U.S. Pat. No. 4,633,237 teaches an occupant sensor for a hospital bed including a plurality of sensors defining interstices of a matrix of such sensors. The matrix is woven into a mat for placement on a bed in which a patient is confined.

BRIEF DESCRIPTION OF THE DRAWINGS

The invention may take physical form in certain parts and arrangement of parts, a preferred embodiment of which will be described in detail in this description and illustrated in the accompanying drawings which form a part hereof and wherein:

FIGS. 12, 13 and 14 are plan views of variable resistance force sensors suitable for use in the practice of the present invention.

DETAILED DESCRIPTION OF THE INVENTION

Referring first to FIGS. 1 through 4 there are shown exploded, front elevation, side elevation and top view, respectively, of a vehicle seat equipped with an occupant sensing apparatus in accordance with the present invention. of course it is understood that the design of various structural components of a vehicle seat can vary from one make and model of vehicle to another, with the vehicle seat shown being merely exemplary of a vehicle seat that may be employed in the practice of the present invention. The present invention does, however, apply to seats in general and may be employed not only with vehicle seats but also any seat where it is desired to ascertain whether or not the seat is occupied and the weight of a seat occupant.

Figure 1:
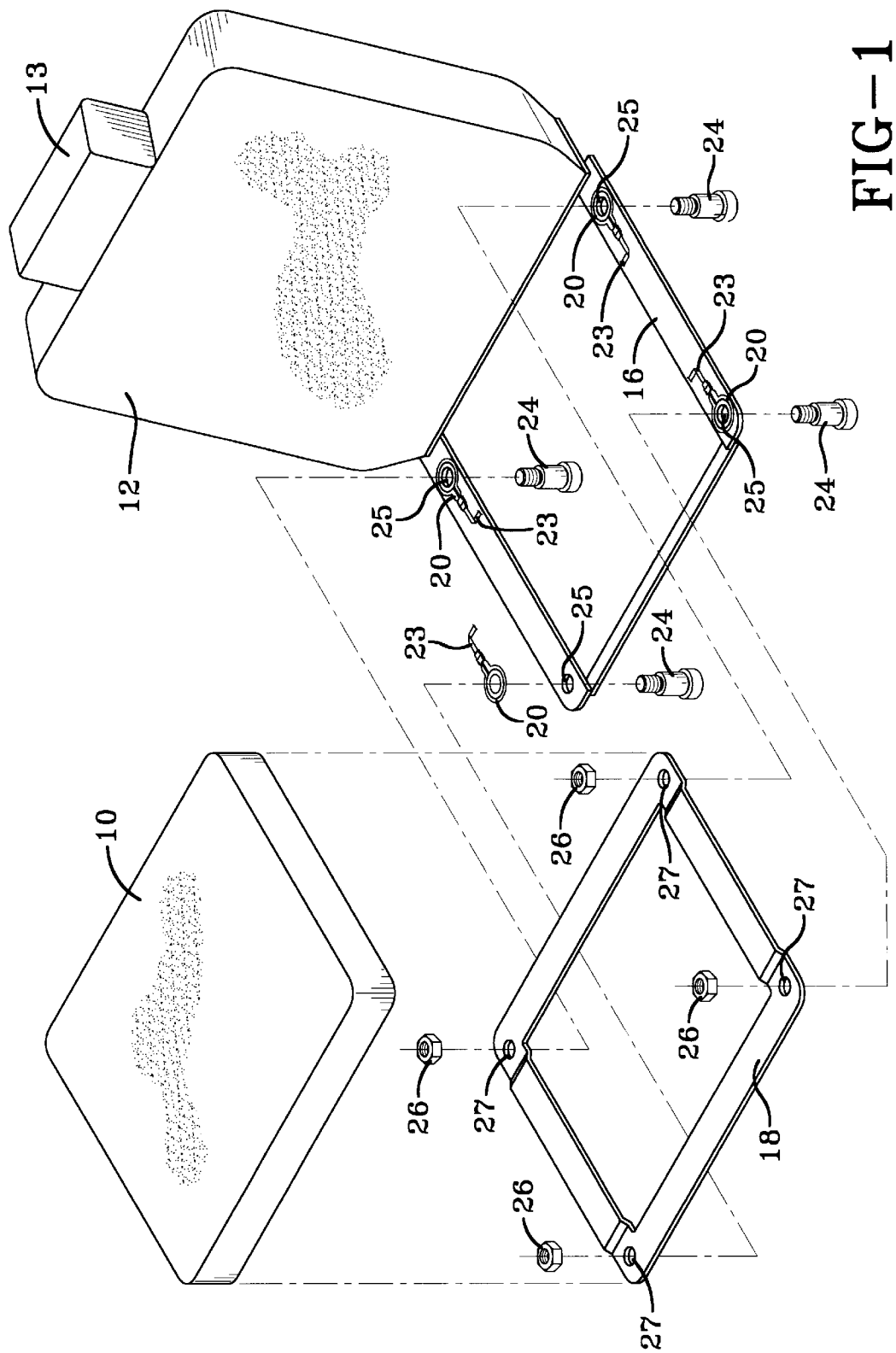
FIG. 1 is an exploded view of a vehicle seat equipped with an occupant sensing apparatus in accordance with the present invention.
Figure 4:
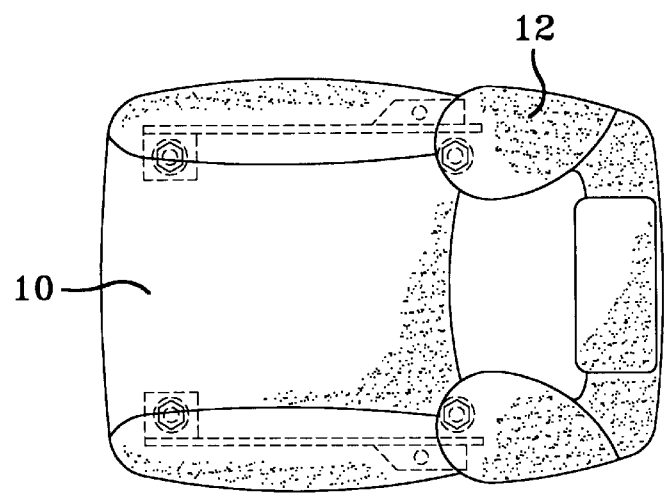
FIG. 4 is a top view of a vehicle seat equipped with an occupant sensing apparatus in accordance with the present invention.
Figure 2:
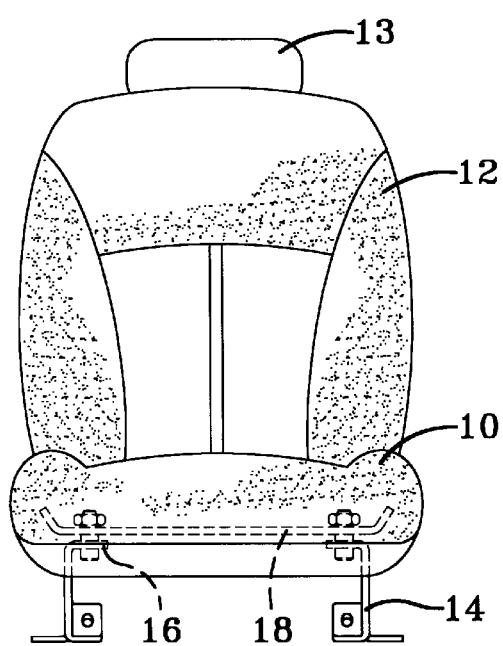
FIG. 2 is a front elevation view of a vehicle seat equipped with an occupant sensing apparatus in accordance with the present invention.
Figure 3:
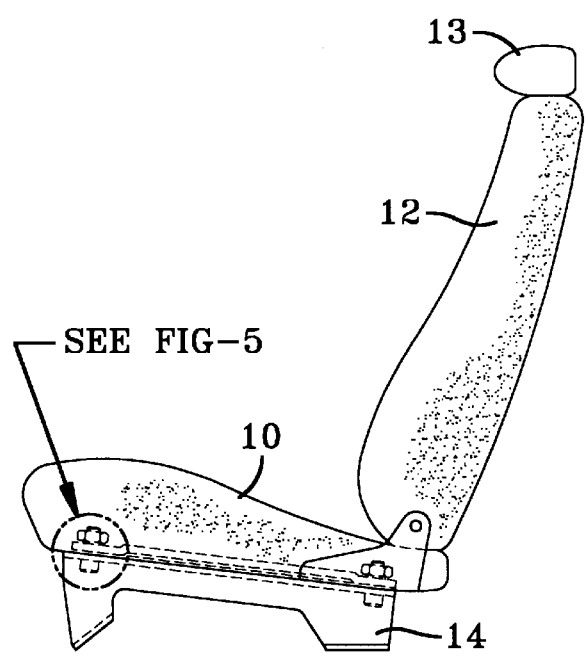
FIG. 3 is a side elevation view of a vehicle seat equipped with an occupant sensing apparatus in accordance with the present invention.

A vehicle seat has a seat cushion 10 and a seat back 12. The seat back may have a head rest 13 associated therewith. The seat back may be pivotally attached to the remainder of the seat, as best seen in FIG. 3. The seat cushion 10 and seat back 12 are normally padded, for example with foam rubber, and may contain springs to provide comfort for a seat occupant. The seat has legs 14 which extend between the floor of the vehicle and a rigid seat support member 16, sometimes referred to as the seat frame. The rigid seat support member may be unitary, as shown in FIG. 1, with a cross member extending between two side rails, or the side rails may be only be joined to one another by the seat back and maintained parallel to one another by fastening the seat legs to the floor of the vehicle.

A rigid seat pan member 18 supports the seat cushion 10, which is adapted to be secured thereto by having bottom side that is contoured to be complementary to the rigid seat pan member. The rigid seat pan member has a generally rectangular shape which may be adapted to the design of a particular seat cushion and seat frame. As shown in FIG. 1 the rigid seat pan member is substantially a flat frame, however, in some seat designs the perimeter of the rigid seat pan member may be bent to form peripheral walls which may, or may not, have a second horizontal portion associated therewith.

Figure 5:
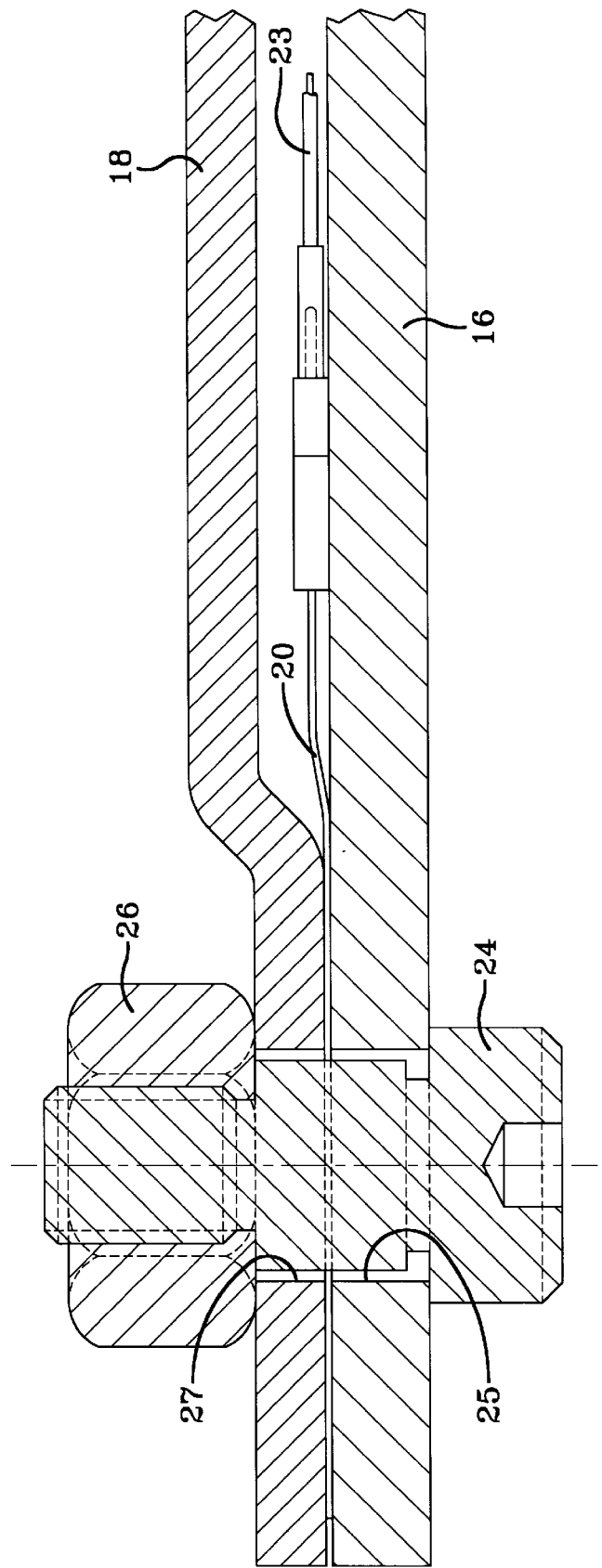
FIG. 5 is an enlarged fragmentary view of a variable resistance force sensor located between rigid components of a vehicle seat equipped with an occupant sensing apparatus in accordance with the present invention.
Figure 5A:
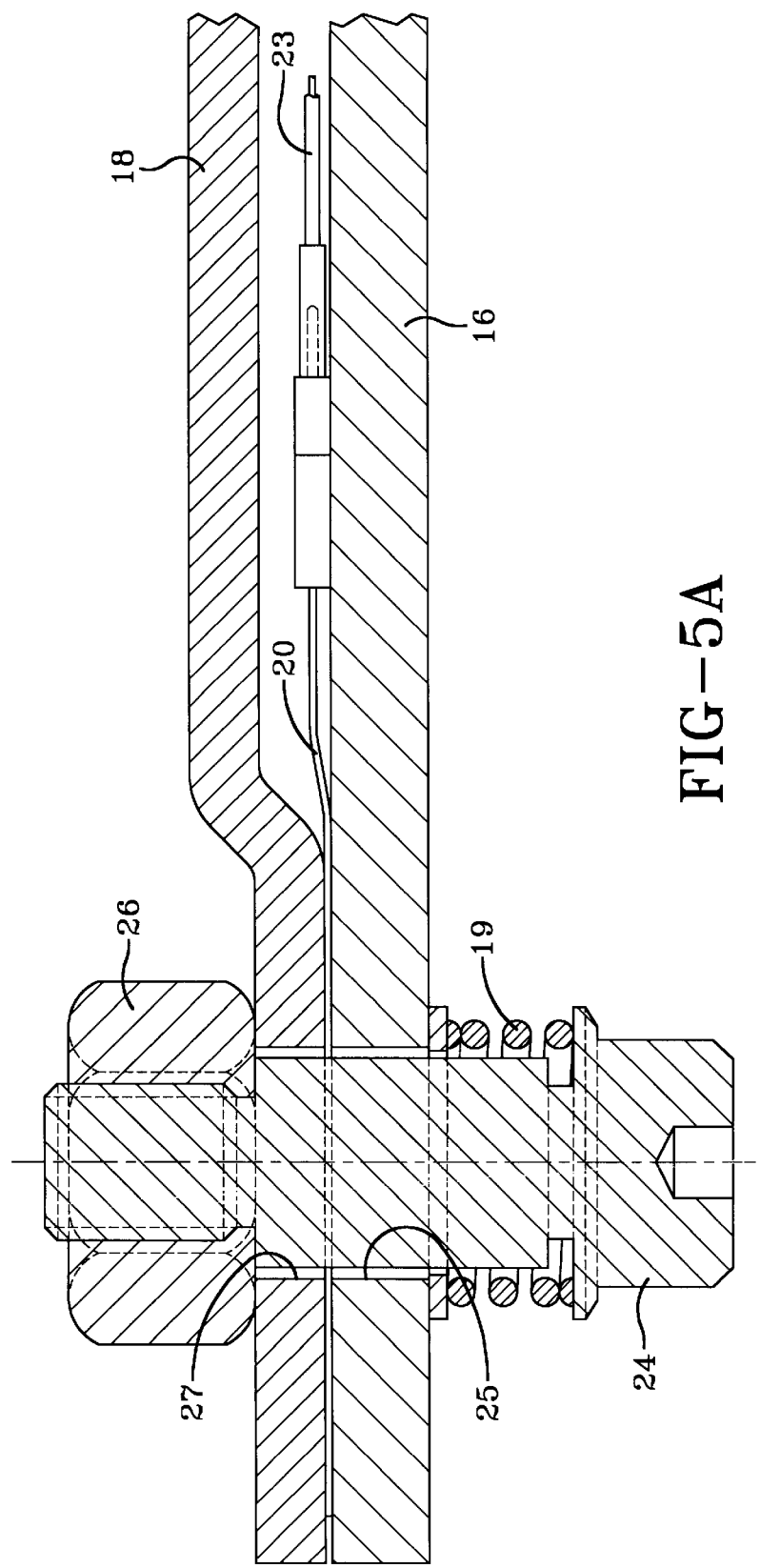
FIG. 5A is an enlarged fragmentary view of a variable resistance force sensor located between rigid components of a vehicle seat equipped with an occupant sensing apparatus in accordance an alternative embodiment with the present invention.

The rigid seat support member 16 and the rigid seat pan member 18 are fastened to one another in a vertically juxtaposed relationship, as best shown in FIGS. 5 and 5A. In these examples the means for fastening the rigid seat support member and the rigid seat pan member to one another are a plurality of bolts 24 and nuts 26. The bolts extend through openings 25 in the rigid seat support member 16 and openings 27 in the rigid seat pan member 18.

As shown in FIGS. 5 and 5A plurality of variable resistance force sensors 20 are interposed between and adjacent to both the rigid seat support member 16 and the rigid seat pan member 18 with the force transferred from the rigid seat pan member to the floor of the vehicle passing through said variable resistance force sensors which sense the magnitude of the force transferred therethrough and generate a signal which is indicative of the force transferred therethrough. The rigid seat pan member 18 shown in the drawings has a generally rectangular shape and a variable resistance force sensor is located in the vicinity of each corner of the rigid seat pan member. That is to say, the variable resistance force sensors are disposed at the corners of a parallelogram at the corners of a rectangle. As used herein and in the claims the terms "corner" and "corners" are understood to have their common meaning of the position(s) at which two lines or surfaces meet. When the variable resistance force sensors were installed at the attachment points between the rigid seat pan member and the rigid seat support member as shown in FIG. 5 a significant preload was placed on the force sensors. The result of this preload was a significant reduction in system resolution as the force sensors were subjected to a preload, or clamp load, on the order of 1,000 pounds while the seat occupant sensing system is trying to detect a seat occupant load of only about 66 pounds (approximately 17 pounds per force sensor). The operation of the seat occupant sensing system was improved by employing the structure shown in FIG. 5A. At each fastening (clamping) point the conventional nut and bolt fastening means shown in FIG. 5 was replaced with a spring loaded fastening means comprising a shoulder bolt 24, a coil spring 19 disposed circumferentially about the shoulder bolt and located between the head of the bolt and a rigid member 16 or 18, a washer and a nut. This preferred structure allows the force sensors to remain in the load path while being subjected to only a nominal preload provided by the spring load and the weight of the seat structure. While a coil spring is shown in the example, it is understood that any other suitable method of reducing the preloading on the sensors may be employed in the practice of the present invention.

Figure 6:
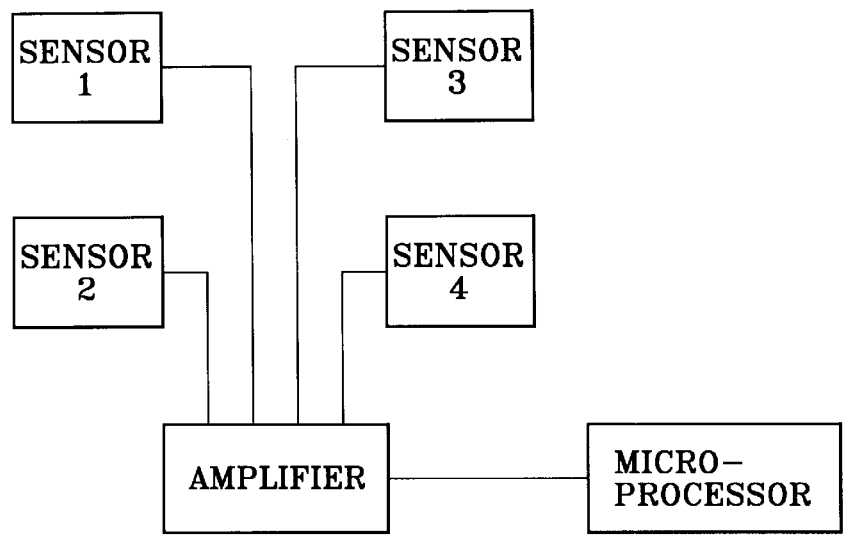
FIG. 6 is a schematic view of an occupant sensing apparatus in accordance with the present invention.

Each variable resistance force sensor 20 has a plurality of electrical leads 23 extending therefrom for communicating with a device which processes the signal from each variable resistance force sensor to determine the weight that the rigid seat pan is bearing. Referring next to FIG. 6 there is shown a schematic view of an occupant sensing apparatus in accordance with the present invention. Signals from the variable resistance force sensors are conveyed, through an amplifier, or any other suitable signal conditioning electronics, to a device, such as a microprocessor which processes the signals, to determine the weight that the rigid seat pan member is bearing. Algorithms to translate a signal from an electronic sensor to a weight are well known. The algorithm must take into account the weight of the seat structure located above the sensors in determining the weight of the seat occupant. Of course if the weight of the seat occupant is determined to be zero, the seat is unoccupied.

Because of the semi-conductive nature of the inks used in the force sensitive material of the sensors these sensors exhibit a significant shift in sensitivity with variations in temperature. The sensors exhibit an increase in sensitivity with increases in temperature and vice versa. For a temperature range of about 30° to 110° Fahrenheit the temperature correction factor for the variable resistance force sensors disclosed herein can be modeled as:

$$CF = M^{(T-76)}$$

where:

CF is the correction factor

T is the temperature in degrees Fahrenheit

M is a constant characterizing the sensor

Generally speaking, the constant will be a function of the force sensitivity of the sensor.

The spring preloading of the sensors disclosed above reduces, but does not completely eliminate, the preloading of the sensors. For example the preloading can change because of temperature variations. Therefore, in order for the seat occupant sensing system to be calibrated, and remain in calibration, the preload values must either remain constant or the calibration model must be updated repeatedly to account for changes in the preload value. In the prototype system the preload values were found to vary by as much as twenty-five pounds during normal seat usage. It is necessary to determine when a seat is vacated (unloaded) by an occupant so that the system can read and update the preload values accordingly. The force (weight) on the sensors changes most drastically when an occupant sits down or gets up from a seat. Based on this distinctive rate of loading change, the state of the seat can be determined and the preloading adjusted accordingly.

Figure 7:
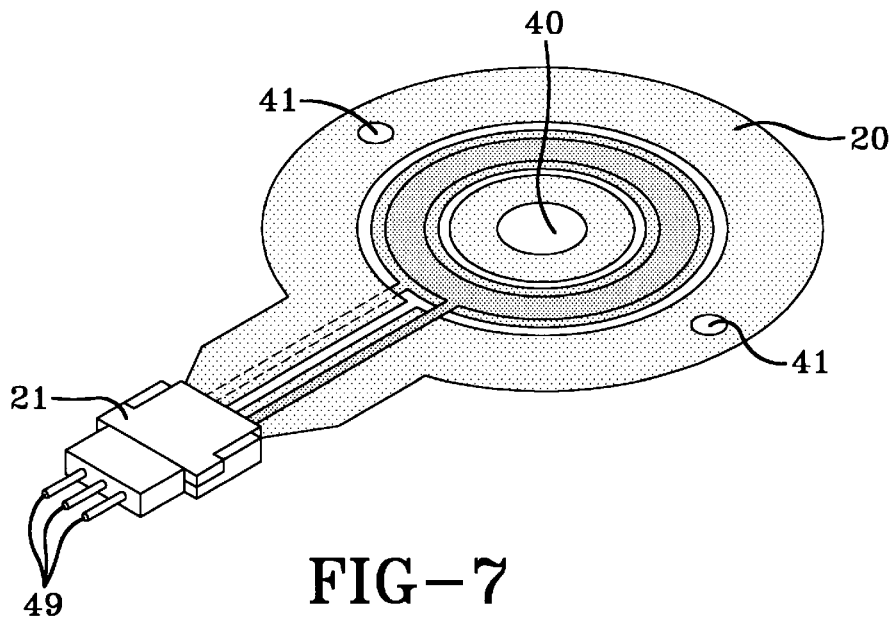
FIG. 7 is a perspective view of a variable resistance force sensor suitable for use in the practice of the present invention.

A working prototype of a vehicle seat equipped with an occupant sensing apparatus in accordance with the present invention employed four sensors 20, as shown in FIGS. 7 and 12, which were obtained from Force Imaging Technology, Inc. of Chicago, Ill. U.S.A. The variable resistance force sensors may be conventional force sensors, for example made in accordance with U.S. Pat. No. 5,086,652 and U.S. Pat. No. 5,222,399, which are incorporated herein by reference, and may be from 0.002 to 0.005 inches in thickness. The variable resistance force sensors each comprise a pair of thin backing sheets, each having an electrode 54,53 thereon disposed in a confronting pattern and a force sensitive material 50 therebetween, the resistance of the force sensitive material changing with changes in the force applied against said variable resistance force sensor which generates a signal which is indicative of the force transferred therethrough. The thin backing sheets are a plastic material, such as a polyester film. The electrodes 53,54 may be silver or any other suitable material, and may be screen printed on the backing sheets or applied using any other suitable manufacturing technique. An air passage 55 is left between the force sensitive material 50 and the atmosphere to prevent back pressure problems. The electrodes 53,54 are conductively attached to a fitting 21 which has connection means, such as pins 49, which facilitate the conduction of signal from the sensor via electrical leads 23. A force sensitive material 50 is deposited by screen printing, or any other suitable manufacturing technique, and is interposed between the confronting electrodes. The force sensitive material in the sensor of FIGS. 7 and 12 is configured in an annular ring of substantially constant width with an aperture 40 through the thin backing sheets in the center of the annular ring. The aperture facilitates the passage of a fastening means, such as bolt, therethrough to fasten seat components to one another or the seat to the vehicle floor.

The force sensitive material may be any suitable material such as a carbon-molybdenum disulfide material in an acrylic binder. Preferably the force sensitive material is a carbon-free force sensing ink having a resistance which varies as a function of the force applied thereagainst, said force sensing ink being usable in force sensing applications at temperatures up to 150° Fahrenheit and pressures of up to 10,000 pounds per square inch. The preferred ink includes a thermoplastic polyimide binder, conductive particles, intrinsically semi-conductive particles, and dielectric particles, all of an average particle size of 1.0 micron or less. The preferred semi-conductive particles are molybdenum disulfide, ferric and ferrous oxide particles. The preferred conductive particles are conductive metal oxide compounds that deviate from stoichiometry based on an oxygen value of two, such as conductive tin oxide, $Fe_3O_4$ iron oxide, and mixtures of them. The preferred dielectric particles are silica. The binder is present in an amount of 20% to 80% by volume. A variable resistance force sensor employing this preferred material and a method of making the same are taught in U.S. Pat. No. 5,541,570 which is incorporated herein by reference for the purpose of teaching the preferred force sensitive material, variable resistance force sensors, and methods of making the same.

With reference to FIGS. 13 and 14 there are shown alternative embodiments of variable resistance force sensors 60,70 that may be used in the practice of the present invention. Buttons 51,52 of force sensitive material are connected by narrower conductors 56,57 of the same force sensitive material, or any suitable conductor, to form circular arrays with an aperture 40 through the thin backing sheets in the center of the circular array. It is understood that the exact configuration of the force sensitive material may be varied in accordance with good engineering practices to suit a particular application without varying from the scope of the present invention.

Figure 8:
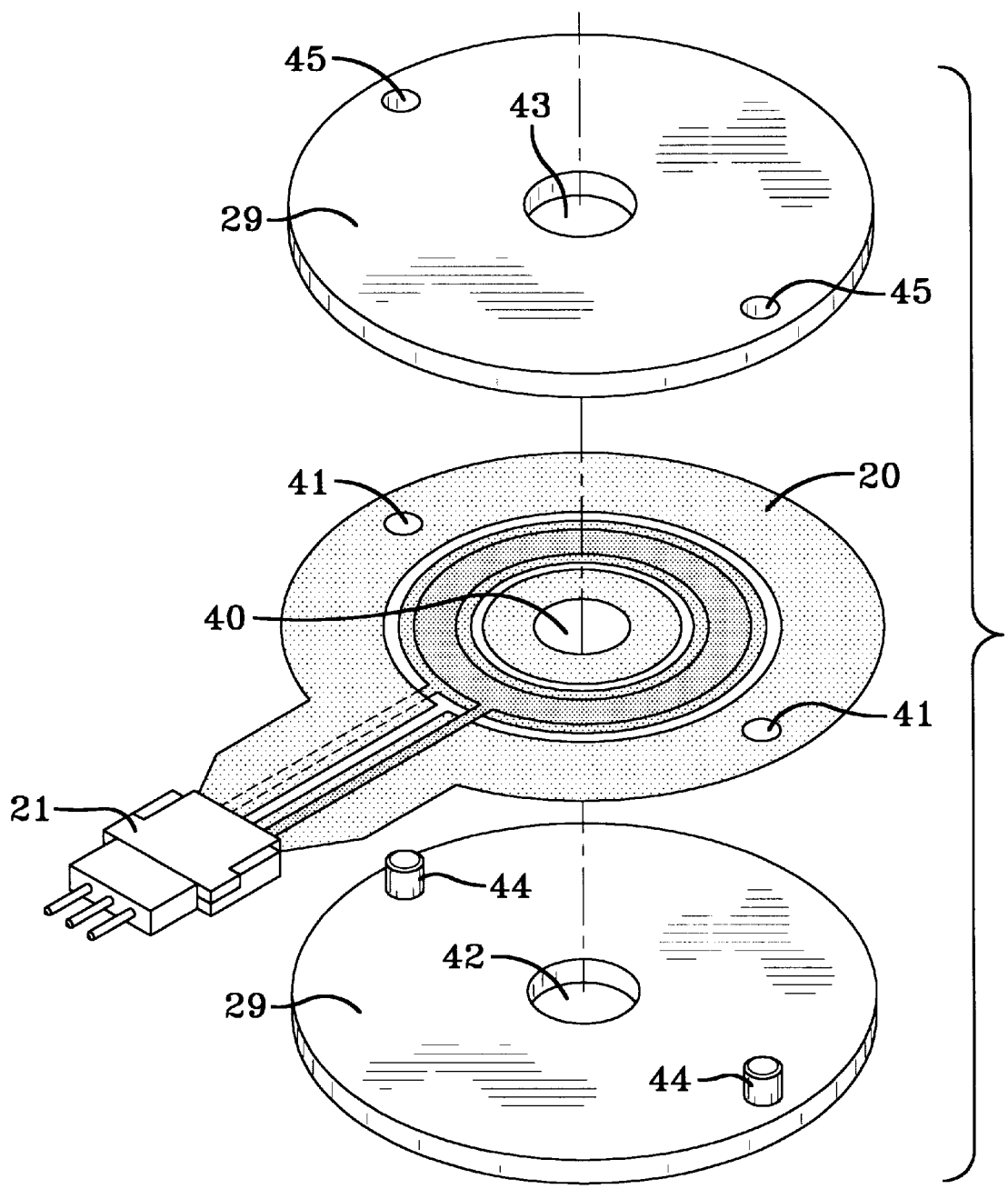
FIG. 8 is an exploded view of another variable resistance force sensor suitable for use in the practice of the present invention.
Figure 9:
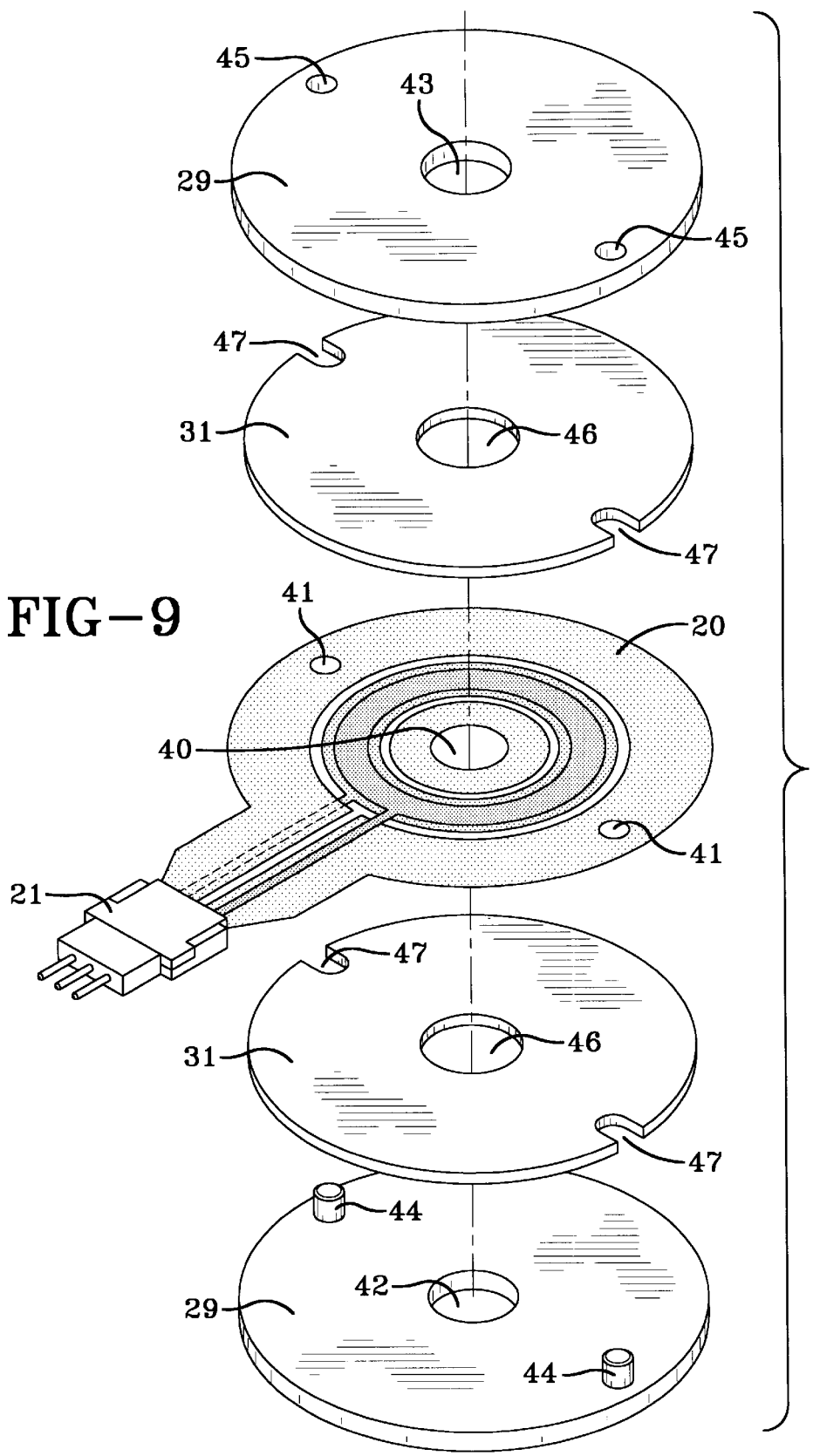
FIG. 9 is an exploded view of another variable resistance force sensor suitable for use in the practice of the present invention.
Figure 11:
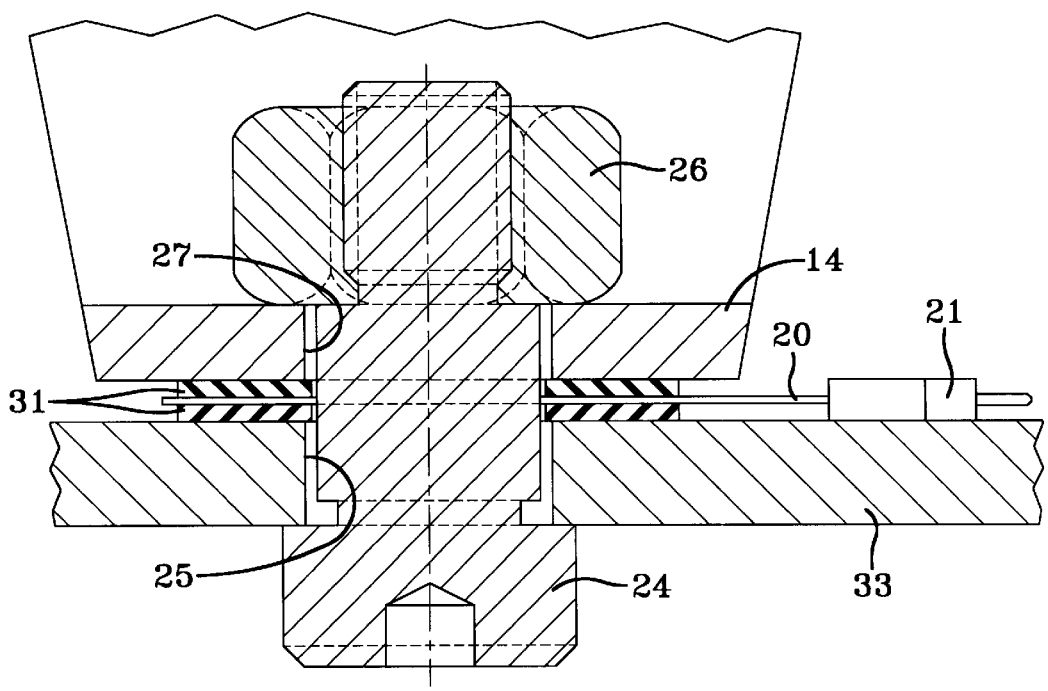
FIG. 11 is an enlarged fragmentary view of a variable resistance force sensor located adjacent to the floor of a vehicle between and a rigid support member of a vehicle seat equipped in accordance with the present invention.

In preferred embodiments of the invention the variable resistance force sensors are sandwiched between layers of materials, such as polymeric substances or metallic materials, which not only aid in reducing contamination of the sensors with abrasive particles but also serve to distribute the load across the entire surface area of the force sensitive material. Referring next to FIG. 8 there is shown an exploded view of another variable resistance force sensor suitable for use in the practice of the present invention. The variable resistance force sensor 20 is sandwiched between layers 29,29 of a metallic material, such as aluminum. As used herein and in the claims the terms "sandwich" and "sandwiched" are understood to have their common meaning of inserting one thing tightly between two other things of differing character or quality. To facilitate the assembly of the variable resistance force sensor 20 with the layers 29,29 of metallic material pins 44 extend from one metallic layer, extend through apertures 41 in the thin backing sheets and fit into complementary apertures 45 in the other metallic layer. The metallic layers 29 have central apertures 42,43 which align with the central aperture 40 in the sensor to facilitate passage of a fastening means, such as a bolt, therethrough. Referring next to FIG. 9 there is shown an exploded view of another variable resistance force sensor, suitable for use in the practice of the present invention, which is similar to that shown in FIG. 8. The variable resistance force sensor being sandwiched between layers 31,31 of an elastomeric substance, such as neoprene, with a layer 29 of a metallic material located on a side of each of the layers of an elastomeric substance which is distal from the variable resistance force sensor. The layers 31 of an elastomeric substance are provided with slots 47, or any other suitable structural feature, to accommodate the mating of the metallic layers with one another. The layers of elastomeric material are also provided with apertures 46 therethrough to facilitate passage of a fastening means, such as a bolt, therethrough. As shown in FIG. 11 the variable resistance force sensor may be sandwiched only between layers 31 of an elastomeric substance.

Figure 10:
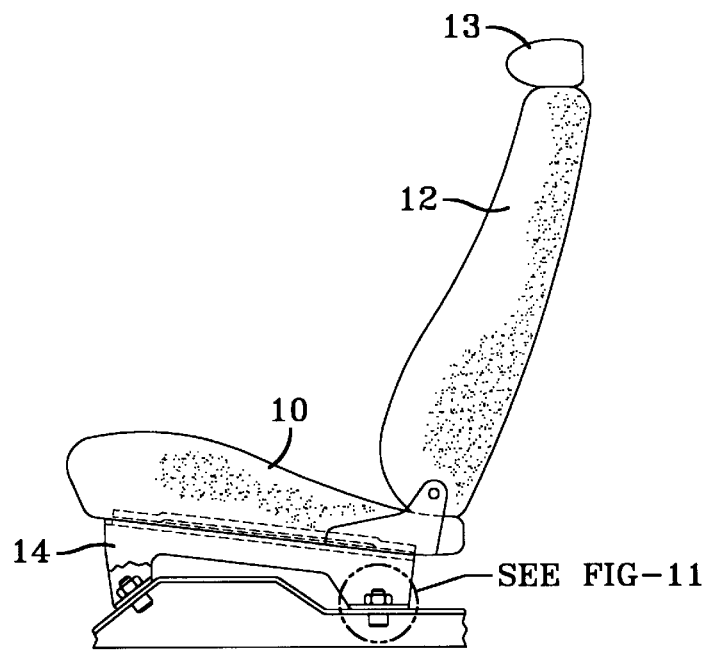
FIG. 10 is a side elevation view of a another vehicle seat equipped with an occupant sensing apparatus in accordance with the present invention.

Referring next to FIGS. 10 and 11 FIG. 10 there is shown a side elevation view of a vehicle seat equipped with an occupant sensing apparatus wherein a variable resistance force sensor is located adjacent to the floor 33 or seat receiving member of a vehicle. In this embodiment a plurality of variable resistance force sensors are interposed between a rigid seat support member 14, which may be for example a seat leg or guide rail, and the floor of the vehicle in a location adjacent to the floor of the vehicle with the force transferred from the rigid seat pan member to the floor of the vehicle passing through the variable resistance force sensors. Other aspects of the invention described above, including the spring preloading of the sensors and various sensor structures may be employed in the practice of this embodiment.

There is a need in the field of inflatable vehicle occupant restraints, such as airbags, to determine if the occupant of the front passenger seat of a motor vehicle equipped with a front passenger side airbag is an infant in an infant seat or a small child weighing less than a preselected amount. The device, such as a microprocessor which determines the weight that the rigid seat pan is bearing is preferably a controller which controls the activation of at least one safety device for an occupant of the seat based upon said weight. The controller controls, for example, the activation of an inflatable vehicle occupant restraint or a seat belt pretensioner. Additionally the controller may control the manner in which an activated safety device operates, for example controlling the speed at which an airbag is inflated or the amount of seat belt slack which is to be taken up by a pretensioner. Thus, the seat occupant sensing system disclosed herein may determine the presence or absence of an object or person on a seat cushion, and the weight of the person or object on a seat cushion and based upon those determinations may activate one or more safety devices, and/or the manner in which an activated safety device should operate.

While certain representative embodiments and details have been presented for the purpose of illustrating the invention, it will be apparent to those skilled in the art that various changes and modifications may be made therein without departing from the spirit and scope of the invention.

What is claimed is:

1. A seat occupant sensing system comprising:
   (a) a seat having a rigid seat pan member and a rigid seat support member, said seat being fastened to the floor of a vehicle;
   (b) a plurality of variable resistance force sensors located between the rigid seat pan member and the floor of the vehicle with the force transferred from the rigid seat pan member to the floor of the vehicle passing through said variable resistance force sensors which sense the magnitude of the force transferred therethrough and generate a signal which is indicative of the force transferred therethrough; and
   (c) a device which processes said signals to determine the weight that the rigid seat pan member is bearing.

2. A seat occupant sensing system according to claim 1 wherein the variable resistance force sensors are interposed between and adjacent to both the rigid seat support member and the rigid seat pan member.

3. A seat occupant sensing system according to claim 2 wherein the rigid seat pan member has a generally rectangular shape and a variable resistance force sensor is located in the vicinity of each corner of the rigid seat pan member.

4. A seat occupant sensing system according to claim 1 wherein the variable resistance force sensors are interposed between the rigid seat support member and the floor of the vehicle in a location adjacent to the floor of the vehicle.

5. A seat occupant sensing system according to claim 4 wherein the variable resistance force sensors are disposed at the corners of a parallelogram.

6. A seat occupant sensing system according to claim 4 wherein the variable resistance force sensors are disposed at the corners of a rectangle.

7. A seat occupant sensing system according to any of claims 1, 2, 3, 4, 5 or 6 wherein the variable resistance force sensors comprise a pair of thin backing sheets, each having an electrode thereon disposed in a confronting and a force sensitive material therebetween, the resistance of said force sensitive material changing with changes in the force applied against said variable resistance force sensor.

8. A seat occupant sensing system according to any of claims 1, 2, 3, 4, 5 or 6 wherein the variable resistance force sensors comprise an assembly of a variable resistance force sensor with layers of an elastomeric substance, each variable resistance force sensor comprising a pair of thin backing sheets, each having an electrode thereon disposed in a confronting pattern and a force sensitive material therebetween, the resistance of said force sensitive material changing with changes in the force applied against said variable resistance force sensor, each said variable resistance force sensor being sandwiched between layers of an elastomeric substance.

9. A seat occupant sensing system according to any of claims 1, 2, 3, 4, 5 or 6 wherein the variable resistance force sensors comprise an assembly of a variable resistance force sensor with layers of a metallic material, each variable resistance force sensor comprising a pair of thin backing sheets, each having an electrode thereon disposed in a confronting pattern and a force sensitive material therebetween, the resistance of said force sensitive material changing with changes in the force applied against said variable resistance force sensor, each said variable resistance force sensor being sandwiched between layers of a metallic material.

10. A seat occupant sensing system according to any of claims 1, 2, 3, 4, 5 or 6 wherein the variable resistance force sensors comprise an assembly of a variable resistance force sensor with layers of an elastomeric substance and a metallic material, each variable resistance force sensor comprising a pair of thin backing sheets, each having an electrode thereon disposed in a confronting pattern and a force sensitive material therebetween, the resistance of said force sensitive material changing with changes in the force applied against said variable resistance force sensor, each said variable resistance force sensor being sandwiched between layers of an elastomeric substance with a layer of a metallic material located on a side of each of the layers of an elastomeric substance which is distal from the variable resistance force sensor.

11. A seat occupant sensing system comprising:
    (a) a seat having a rigid seat pan member and a rigid seat support member, said seat being fastened to the floor of a vehicle;
    (b) a plurality of variable resistance force sensors located between the rigid seat pan member and the floor of the vehicle with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and
    (c) a controller which processes the signals from said variable resistance force sensors to determine the weight that the rigid seat pan member is bearing and controls the activation of at least one safety device for an occupant of said seat based upon said weight.

12. A seat occupant sensing system according to claim 11 wherein the controller controls the activation of an inflatable vehicle occupant restraint.

13. A seat occupant sensing system according to claim 11 wherein the controller controls the activation of a seat belt pretensioner.

14. A seat occupant sensing system according to claim 11 wherein the controller controls the activation and method of operation of an inflatable vehicle occupant restraint.

15. A seat occupant sensing system comprising:
    (a) a seat having a rigid seat pan member and a rigid seat support member, said seat being fastened to the floor of a vehicle;
    (b) a plurality of variable resistance force sensors interposed between and adjacent to both the rigid seat support member and the rigid seat pan member with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and
    (c) a controller which processes the signals from said variable resistance force sensors to determine the weight that the rigid seat pan member is bearing and controls the activation of at least one safety device for an occupant of said seat based upon said weight.

16. A seat occupant sensing system according to claim 15 wherein the variable resistance force sensors are disposed at the corners of a parallelogram.

17. A seat occupant sensing system according to claim 15 wherein the variable resistance force sensors are disposed at the corners of a rectangle.

18. A seat occupant sensing system according to claim 15 wherein the rigid seat pan member has a generally rectangular shape and a variable resistance force sensor is located in the vicinity of each corner of the rigid seat pan member.

19. A seat occupant sensing system according to any of claims 15, 16, 17 or 18 wherein each said variable resistance force sensor is sandwiched between layers of an elastomeric substance.

20. A seat occupant sensing system according to any of claims 15, 16, 17 or 18 wherein each said variable resistance force sensor is sandwiched between layers of a metallic material.

21. A seat occupant sensing system according to any of claims 15, 16, 17 or 18 wherein each said variable resistance force sensor is sandwiched between layers of an elastomeric substance with a layer of a metallic material located on a side of each of the layers of an elastomeric substance which is distal from the variable resistance force sensor.

22. A seat occupant sensing system according to any of claims 15, 16, 17 or 18 wherein the controller controls the activation of an inflatable vehicle occupant restraint.

23. A seat occupant sensing system according to any of claims 15, 16, 17 or 18 wherein the controller controls the activation of a seat belt pretensioner.

24. A seat occupant sensing system according to any of claims 15, 16, 17 or 18 wherein the controller controls the activation and method of operation of an inflatable vehicle occupant restraint.

25. A seat occupant sensing system according to any of claims 15, 16, 17 or 18 wherein the rigid seat support member and the rigid seat pan member are fastened to one another by spring loaded fastening means.

26. A seat occupant sensing system comprising:

(a) a seat having a rigid seat pan member and a rigid seat support member, said seat being fastened to the floor of a vehicle;

(b) a plurality of variable resistance force sensors interposed between the rigid seat support member and the floor of the vehicle in a location adjacent to the floor of the vehicle with the force transferred from the rigid seat pan member to the floor of the vehicle passing through said variable resistance force sensors, the variable resistance force sensors each comprising a pair of thin backing sheets, each having an electrode thereon disposed in a confronting pattern and a force sensitive material therebetween, the resistance of said force sensitive material changing with changes in the force applied against said variable resistance force sensor which generates a signal which is indicative of the force transferred therethrough; and (c) a controller which processes the signals from said variable resistance force sensors to determine the weight that the rigid seat pan member is bearing and controls the activation of at least one safety device for an occupant of said seat based upon said weight.

27. A seat occupant sensing system according to claim 26 wherein the variable resistance force sensors are disposed at the corners of a parallelogram.

28. A seat occupant sensing system according to claim 26 wherein the variable resistance force sensors are disposed at the corners of a rectangle.

29. A seat occupant sensing system according to any of claims 26, 27 or 28 wherein each said variable resistance force sensor is sandwiched between layers of an elastomeric substance.

30. A seat occupant sensing system according to any of claims 26, 27 or 28 wherein each said variable resistance force sensor is sandwiched between layers of a metallic material.

31. A seat occupant sensing system according to any of claims 26, 27 or 28 wherein each said variable resistance force sensor is sandwiched between layers of an elastomeric substance with a layer of a metallic material located on a side of each of the layers of an elastomeric substance which is distal from the variable resistance force sensor.

32. A seat occupant sensing system according to any of claims 26, 27 or 28 wherein the controller controls the activation of an inflatable vehicle occupant restraint.

33. A seat occupant sensing system according to any of claims 26, 27 or 28 wherein the controller controls the activation of a seat belt pretensioner.

34. A seat occupant sensing system according to any of claims 26, 27 or 28 wherein the controller controls the activation and method of operation of an inflatable vehicle occupant restraint.

* * * * *